(12) United States Patent
Oren

(10) Patent No.: US 7,302,180 B2
(45) Date of Patent: Nov. 27, 2007

(54) DUAL HOMING FOR DWDM NETWORKS IN FIBER RINGS

(75) Inventor: Yair Oren, Tel-Aviv (IL)

(73) Assignee: Chromatis Networks Inc., Dover, DE (US)

( * ) Notice: Subject to any disclaimer, the term of this patent is extended or adjusted under 35 U.S.C. 154(b) by 0 days.

(21) Appl. No.: 11/258,325

(22) Filed: Oct. 24, 2005

(65) Prior Publication Data

US 2006/0045519 A1 Mar. 2, 2006

Related U.S. Application Data

(63) Continuation of application No. 10/019,364, filed as application No. PCT/US00/00105 on Jan. 4, 2000.

(60) Provisional application No. 60/137,983, filed on Jun. 7, 1999.

(51) Int. Cl.
*H04B 10/00* (2006.01)

(52) U.S. Cl. .............................. 398/70; 398/59; 398/5

(58) Field of Classification Search ............... 398/1–8, 398/59, 70
See application file for complete search history.

(56) References Cited

U.S. PATENT DOCUMENTS

| | | | |
|---|---|---|---|
| 4,482,980 A | 11/1984 | Korowitz et al. | |
| 4,704,713 A | 11/1987 | Haller et al. | |
| 4,837,856 A * | 6/1989 | Glista, Jr. | 398/6 |
| 5,406,401 A | 4/1995 | Kremer | |
| 5,647,035 A | 7/1997 | Cadeddu et al. | |
| 5,903,370 A * | 5/1999 | Johnson | 398/4 |
| 6,034,798 A * | 3/2000 | Oberg | 398/2 |

* cited by examiner

*Primary Examiner*—Agustin Bello

(57) ABSTRACT

First and second optical fibers carry information modulated on an optical carrier. Information modulated on the carrier is to be recovered and transmitted at a first node along the first and second optical fibers. The first node includes apparatus for receiving and transmitting the information. The apparatus for receiving and transmitting the information includes a first receiver for demodulating the information modulated on the optical carrier and carried on the first optical fiber, a second receiver for demodulating the information modulated on the optical carrier and carried on the second optical fiber, a transmitter for modulating the information on the second optical fiber, and a splitter for splitting the optical carrier carried on the first optical fiber. The splitter is coupled to the first optical fiber and the first receiver. A portion of the optical carrier is coupled to the first receiver and another portion of the optical carrier continues on the first optical fiber.

16 Claims, 6 Drawing Sheets

DUAL HOMING FOR DWDM NETWORKS IN FIBER RINGS

CROSS-REFERENCE TO RELATD APPLICATIONS

This application is a continuation of co-pending Application Ser. No. 10/019,364, filed Oct. 25, 2001, in the name of Yair Oren, titled DUAL HOMING FOR DWDM NETWORKS IN FIBER RINGS which application is a U.S. national counterpart application of International Application Ser. No. PCT/US00/00105, filed Jan. 4, 2000, which claims priority to U.S. Provisional Application Ser. No. 60/137,983, filed Jun. 7, 1999. The foregoing applications are incorporated herein by reference as if set forth in their entireties.

FIELD OF THE INVENTION

Tis invention relates to neworks. It is disclosed in the enviroment of dense wavelength division multiplexed (DWDM) networks, but is believed to be useful in other applcations as well.

BACKGROUND OF THE INVENTION

Referring to FIG. 1, DWDM networks 20 implemented over fiber rings 22 can carry diverse types of traffic such as, for example, SONET, ATM, IP, and so on. These networks 20 are capable of mixing different types of traffic in the same ring 22. A typical DWDM network 20 includes an arbitrary number of nodes 24 interconnected in a ring topology by a pair of optical fibers 26. One of the nodes 24 is designated the hub node 30. The other nodes 24 are referred to as terminal nodes 32. Each terminal node 32 uses one or more dedicated DWDM wavelengths $\lambda J, \lambda K, \ldots \lambda P, 1 \leq J, K, \ldots P \leq N$, to communicate with the hub node 30. The hub node 30 has the capability to switch traffic from one wavelength $\lambda 1, \lambda 2, \ldots \lambda N$ to another. This permits communication between any pair of terminal nodes 32 on the network 20. The DWDM channel $\lambda 1, \lambda 2, \ldots \lambda N$ used to transmit traffic from the hub node 30 to a specific terminal node 32 over one of the fibers 26 is called a downlink. The DWDM channel $\lambda 1, \lambda 2, \ldots \lambda N$ of the same wavelength operating on the other fiber 26 used to transmit traffic from the terminal node 32 to the hub node 30 is called an uplink. The resulting network 20 is sometimes described as a virtual DWDM star network implemented over a fiber ring 22. The protocol used in the interaction between the hub node 30 and a specific terminal node 32 is arbitrary and independent of the protocol used by any other terminal node 32. Examples of protocols include the above-mentioned SONET/SDH, ATM and IP. Where different channels $\lambda 1, \lambda 2, \ldots \lambda N$ use different protocols, all channels $\lambda 1, \lambda 2, \ldots \lambda N$ may be assumed to be using a common protocol, for example, SONET/SDH framing, with the other protocols, for example, ATM, IP and so on, mapped into the assumed common protocol (SONET/SDH frames in this example). Both the hub node 30 and the terminal nodes 32 have the capability to effect the appropriate protocol processing on both incoming and outgoing traffic. All nodes 24, including the hub 30, have local tributary interfaces which permit the connection of external equipment to the network 20.

A network 20 as describe above is expected to be extremely reliable and remain fully or at least partially operational despite faults of different types. Of special, although not exclusive, interest in the context of this application are the following types of faults: the failure of a transceiver in one of the nodes 24; a break or other malfunction in the physical fiber 26 that renders a segment of the ring 22 unusable; and, total or partial failure of the hub node 30.

DISCLOSURE OF THE INVENTION

According to the invention, first and second optical fibers carry information modulated on an optical carrier between at least two nodes. At a first one of the nodes, information modulated on the carrier is to be recovered and transmitted. The first node includes a first receiver for recovering information from the optical carrier carried on the first optical fiber, a second receiver for recovering information modulated on the optical carrier carried on the second optical fiber, a transmitter for modulating the information on the second optical fiber, and a first splitter for splitting the optical carrier carried on the first optical fiber. The first splitter is coupled to the first optical fiber and the first receiver. The optical carrier carried on the first optical fiber is split by the first splitter. A portion of the optical carrier is coupled to the first receiver and another portion of the optical carrier continues on the first optical fiber.

Illustratively, the apparatus for receiving and transmitting the information includes a third receiver for recovering information modulated on the optical carrier carried on the second optical fiber, a fourth receiver for recovering information modulated on the optical carrier carried on the first optical fiber, a transmitter for modulating information on the first optical fiber, and a splitter for splitting the optical carrier carried on the second optical fiber. The splitter is coupled to the second optical fiber and the third receiver. A portion of the optical carrier is coupled to the third receiver and another portion of the optical carrier continues on the second optical fiber.

Illustratively, the apparatus includes a third node. The third node includes a fifth receiver for recovering information modulated on the optical carrier and carried on the first optical fiber, a sixth receiver for recovering information modulated on the optical carrier and carried on the second optical fiber, a third transmitter for recovering information on the second optical fiber, and a third splitter for splitting the optical carrier carried on the first optical fiber. The third splitter is coupled to the first optical fiber and the fifth receiver. A portion of the optical carrier is coupled to the fifth receiver and another portion of the optical carrier continues on the first optical fiber.

Illustratively, the second node includes means for recovering the optical carrier from, and returning the optical carrier to, the first optical fiber.

Illustratively, the second node includes means for recovering the optical carrier from, and returning the optical carrier to, the second optical fiber.

Illustratively, the apparatus further includes a fourth node for recovering the optical carrier from, and returning said optical carrier to, the first optical fiber.

Illustratively, the fourth node includes means for recovering the optical carrier from, and returning the optical carrier to, the second optical fiber.

Illustratively, the first receiver and the second receiver are coupled to a selection function which selects between the optical carrier received over the first optical fiber and the optical carrier received over the second optical fiber.

Illustratively, the third receiver and the fourth receiver are coupled to a selection function which selects between the optical carrier received over the first optical fiber and the optical carrier received over the second optical fiber.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

Figure 1:
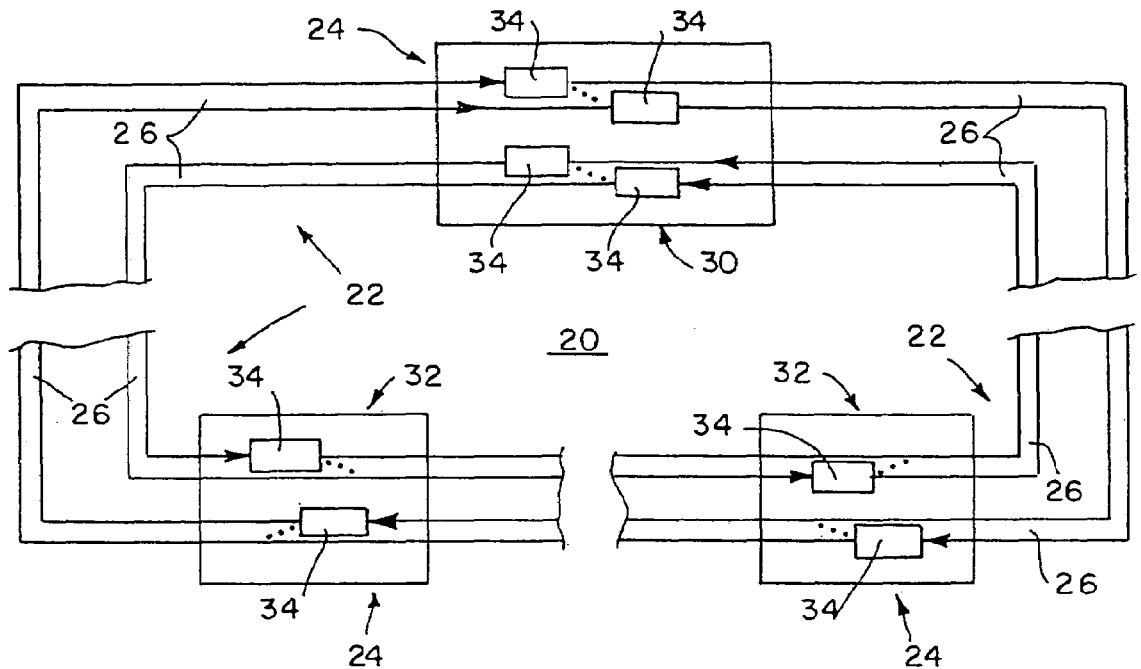
FIG. 1 illustrates a technique for overcoming the failure of a transceiver module in a fiber optic network.

The failure of a transceiver module 34 can be overcome by having a second, redundant transceiver 34 in each node 24 for each wavelength accessed by that node 24. A degree of protection against fiber 26 breaks can be provided by having each node 24 transmit each of its associated wavelengths $\lambda J, \lambda K, \ldots \lambda P$ in both directions around the ring 26, and having the destination node 24 select the better copy. Thus, a combined solution for these problems may be to have two transceivers 34 at each node 24 for each wavelength accessed by that node 24, one receiving and transmitting in one direction (which will sometimes be referred to herein as eastbound) around the ring 26, and the other receiving and transmitting in the other direction (which will sometimes be referred to herein as westbound) around the ring 22.

However, the failure of a hub node 30 still threatens the reliability of the network, since the hub node 30 affects both traffic around the ring 22 and the connection of the ring 22 to other parts of the network 20. An effective solution to the problem of failure of a hub node 30 is to provide a backup for the hub node 30 in the form of a second, redundant hub 30. Providing a second hub node 30 is referred to in the art as "dual homing." This application relates to a cost-effective implementation of dual homing in the environment of DWDM networks in fiber rings 22.

Figure 2:
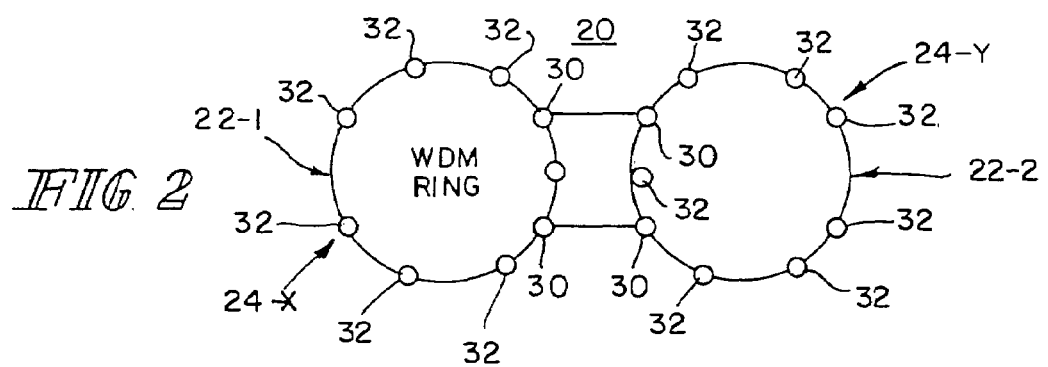
FIG. 2 illustrates a technique for overcoming the failure of a transceiver in a fiber optic network having interconnected rings.

A solution to the above-described problems is to have at each node 24 two transceivers 34 per associated wavelength. The two transceivers 34 at each node 24 transmit to/receive from opposite directions, westbound and eastbound. Referring to FIG. 2, dual homing is employed where two rings 22-1 and 22-2 are interconnected to provide greater fault resiliency. Two diverse paths are provided from a node 24-$x$ on a first one, 22-1, of the rings to a node 24-$y$ on the second ring 22-2. A hub node 30 is provided at each interconnection between the rings 22-1 and 22-2. The second ring 22-2 may be a DWDM ring like the first, or may be, for example, a SONET ring. Duplicating an entire hub node 30 may be expensive, given the high cost of DWDM transmitters. It must be remembered that a hub node 30 terminates all DWDM wavelengths in the network and therefore potentially has a large number of transmitters.

Figure 3:
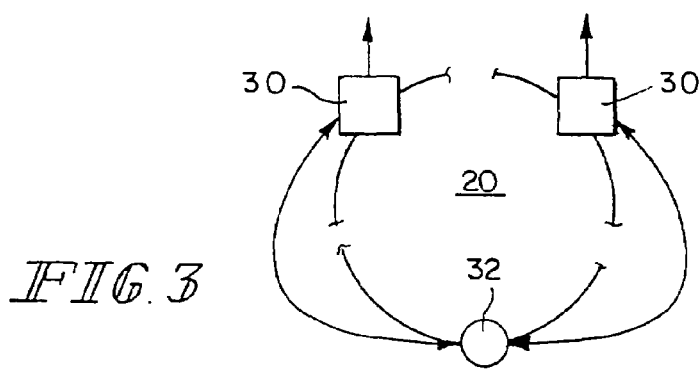
FIG. 3 illustrates a network constructed according to the invention.

A cost-effective method for implementing dual homing in this environment achieves a 50% reduction in the required number of transmitters compared to duplicating an entire hub node 30, without sacrificing the reliability of the network 20. Referring to FIG. 3, each terminal node 32 sends two copies of its traffic, one to each of two hub nodes 30 on the network. Each hub node 30 effects the cross-connect function on all terminal node 32 traffic. Traffic intended for other terminal nodes 32 on the same fiber optic ring 22 is sent on the corresponding downlinks, along with traffic originating in the hub node 30's tributaries. Traffic intended for the hub node 30's local tributary ports is forwarded to those ports. Each terminal node 32 receives two copies of the downlink, one from each hub node 30, and selects the better received one using a conventional selection method.

Figure 4:
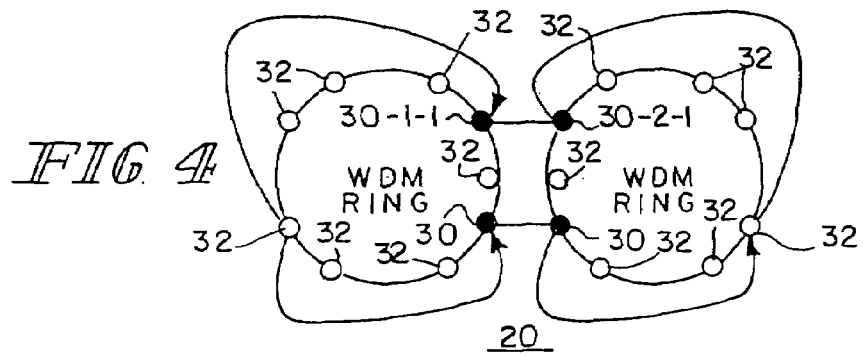
FIG. 4 illustrates a characteristic of networks constructed as illustrated in FIG. 3.
Figure 5:
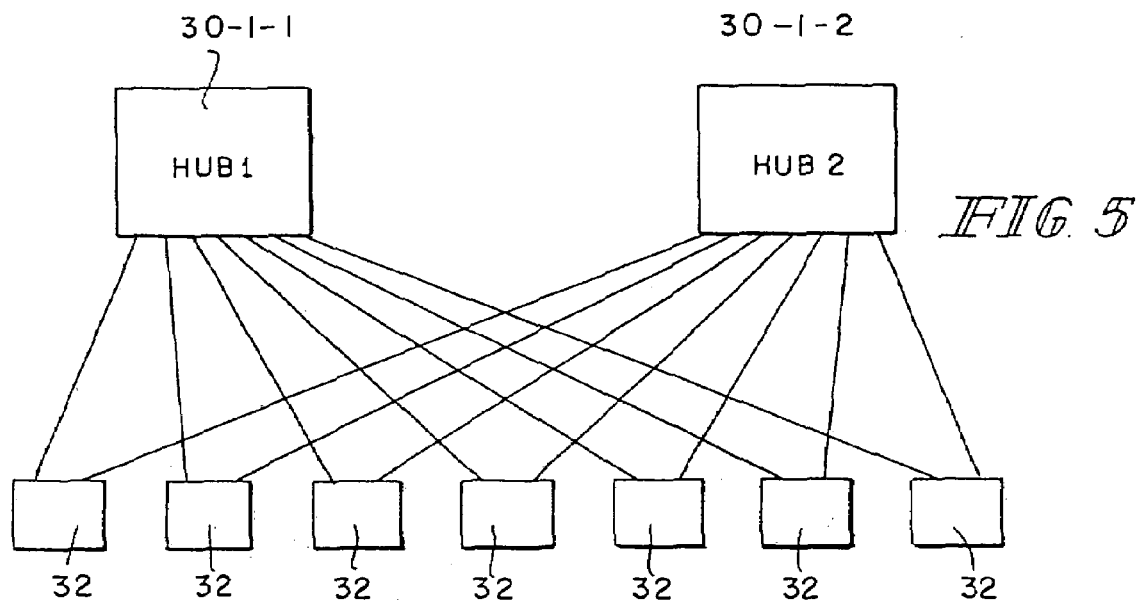
FIG. 5 illustrates the logical topology of the characteristic illustrated in FIG. 4.

In a dual-interconnection configuration, a hub node 30 is located at each interconnection point. Each terminal node 32 sends two copies of its traffic, one to each hub node 30. Each hub node 30 effects the cross-connect function on all terminal node 32 traffic. Traffic intended for other terminal nodes 32 within the same fiber optic ring 22 is sent on the corresponding downlinks. Each hub node, for example, hub node 30-1-1, on the transmitting ring, for example, ring 22-1, sends its copy of the inter-ring traffic to its matching interconnection hub node, for example, hub node 30-2-1, on the receiving ring, for example, ring 22-2. In the receiving ring 22-2, the destination terminal node 32 receives the traffic from both hub nodes 30 on its ring 22-2 and selects the better-received signal using a conventional selection method. This is illustrated in FIG. 4. This logical topology, which may be called a "dual-homed star" topology, is illustrated in FIG. 5.

Figure 6:
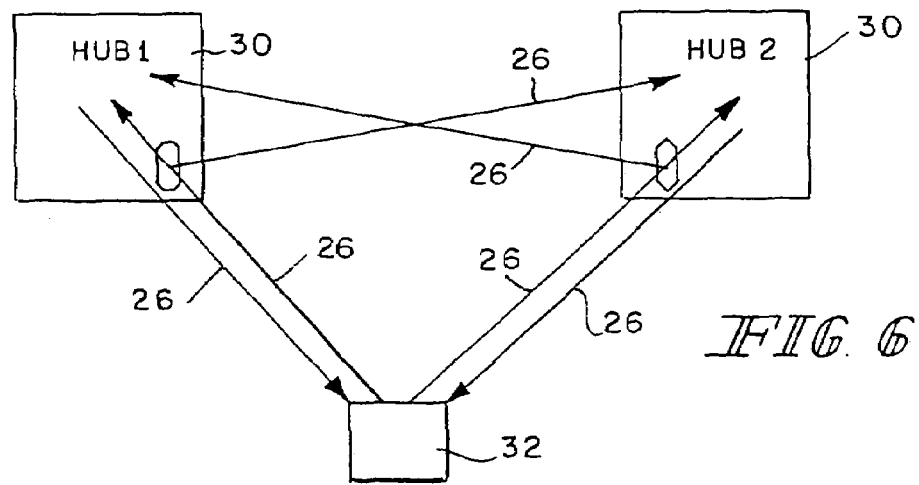
FIG. 6 illustrates a characteristic of networks constructed as illustrated in FIG. 3.

In order to enhance the reliability of the illustrated system, it is desirable to have each hub node 30 receive both uplinks from each terminal node 32. In other words, each hub node 30 drops the uplink it receives, but also continues that uplink to the other hub node 30. This is illustrated in FIG. 6. Each hub node 30 selects the best received copy of each uplink using the selection method and uses the best received copy. When this topology is used, each hub node 30 receives at least one copy of each uplink even when a fiber cut or a failed transmitter disrupts the reception of the other uplink at that hub 30. Using this strategy, which is sometimes called "drop and continue" functionality, also enhances the robustness of a network including interconnected rings 22-1, 22-2. For example, such a network can withstand two simultaneous fiber cuts, one in each ring 22. Drop and continue functionality is used in SONET UPSR rings for these reasons. In SONET networks, the function is implemented electronically. The optical signal of the uplink is converted to an electrical signal and duplicated, one of the duplicate electrical signals becoming a "drop" signal and the other becoming a "continue" signal. The "continue" signal is then retransmitted using another transmitter 38 to the other hub node 30. A similar implementation could be used for hub nodes 30 in DWDM rings 22.

Figure 7:
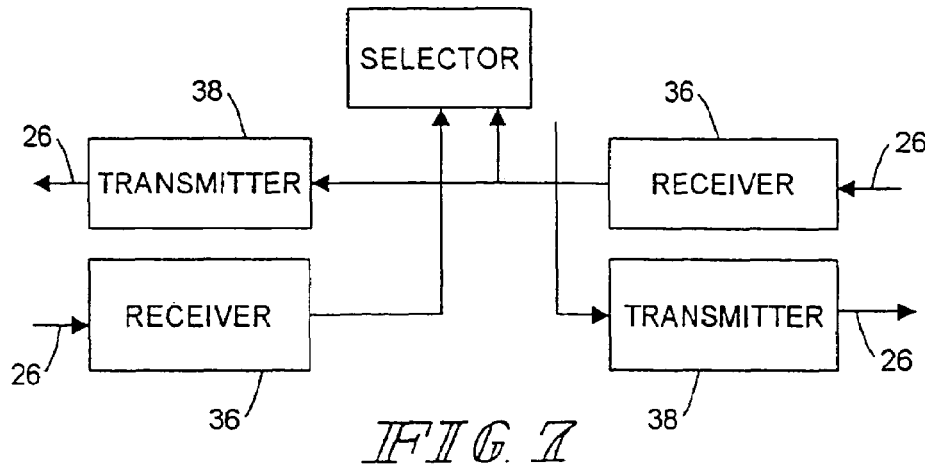
FIG. 7 illustrates certain functions of a system constructed according to the invention.
Figure 8:
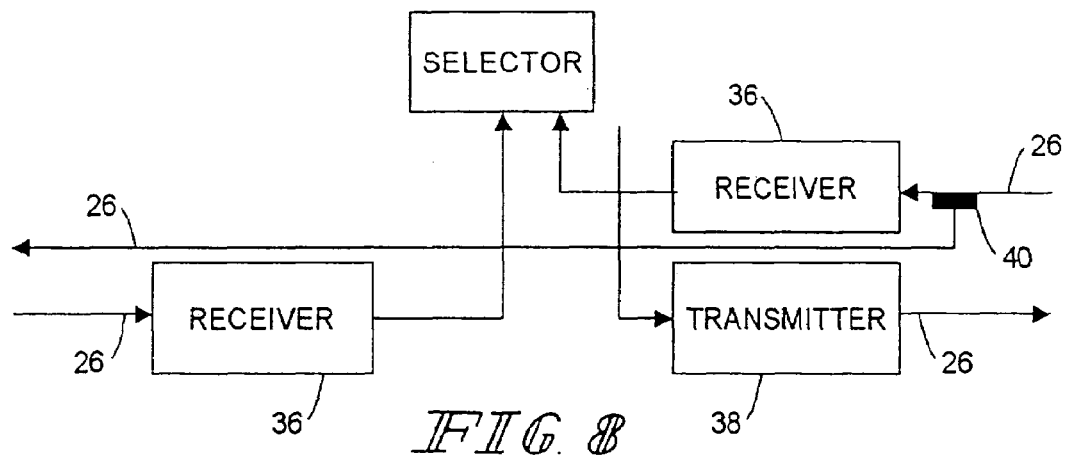
FIG. 8 illustrates a characteristic of networks constructed according to the invention.

FIG. 7 illustrates functions of a hub node 30 for each DWDM wavelength. As may be appreciated, this approach requires two receivers 36 and two transmitters 38 per wavelength. The high cost of DWDM transmitters 38 can make such a strategy rather expensive. In order to eliminate one of the two transmitters 38 the illustrated approach employs optical drop and continue functionality. This is illustrated in FIG. 8. An optical coupler/splitter 40 is used to split the power of the arriving uplink. Some of the power is then directed to the local receiver 36 and the rest is continued to the other hub node 30. The need for a second transmitter 38 is thus overcome. This results in reducing by 50% the number of required transmitters 38 for the two hub nodes 30, while still meeting all the reliability requirements of the dual homing strategy. For example, the network is protected against the failure of a transceiver 34. Each terminal node 32 has two transceivers 34, and is able to send and receive even if one of them fails. Each hub node 30 has two receivers 36 per wavelength, and so is not affected by the loss of one of them.

The loss of a transmitter 38 in one of the hub nodes 30 will not disrupt traffic either, since the transmitter 38 in the other hub node 30 can still transmit the downlink to the destination terminal node 32. The network is protected against fiber 26 cuts. Each terminal node 32 receives two copies of its downlink on completely diverse paths. Likewise each hub node 30 receives two copies of each uplink on completely diverse paths. Thus, no single fiber cut can disrupt the interconnection of the two rings 22. The network is also protected against the loss of a hub node 30. The functions of each hub node 30 are substantially completely duplicated by the other hub nodes 30. Thus the network remains functional even when one of the hub nodes 30 fails partially or completely.

Figure 9:
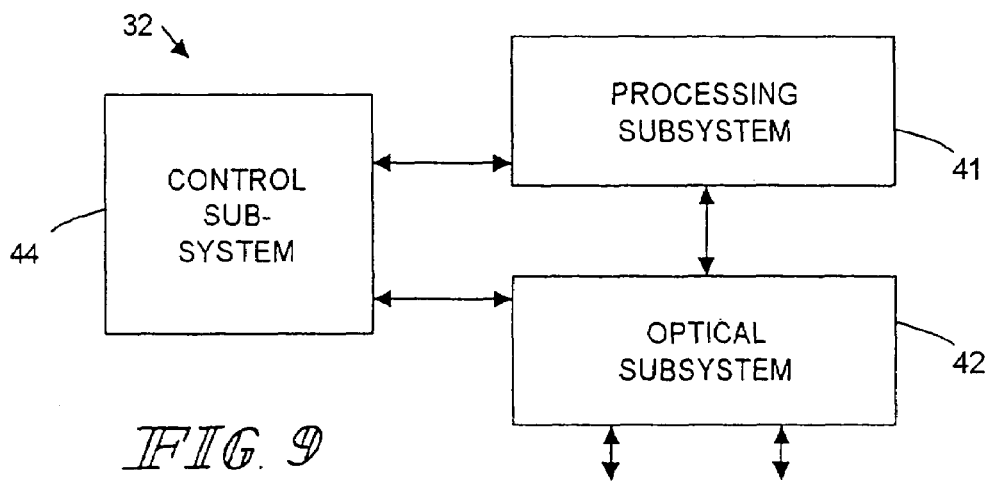
FIG. 9 illustrates a high-level functional diagram of a component of a system constructed according to the invention.

FIG. 9 illustrates a high-level functional diagram of terminal nodes 32. A processing subsystem 41 provides protocol processing appropriate to a particular application. Examples include SONET/SDH multiplexers and ATM multiplexers. The processing subsystem 41 provides electrical signals to an optical subsystem 42, to be transmitted as the uplink on (a) DWDM channel(s) $\lambda J$ (, $\lambda K$, ... $\lambda P$) associated with that terminal node 32, and receives electrical signals derived from the associated downlink DWDM channel(s) $\lambda J$ (, $\lambda K$, ... $\lambda P$). The processing subsystem 41 typically also has external ports of different types in order to connect external devices which use the transport services of network 20. The optical subsystem 42 implements the optical add/drop function for the DWDM channel(s) $\lambda J$ (, $\lambda K$, ... $\lambda P$). It also incorporates the required transceivers 34. A control subsystem 44 manages, configures and monitors the operation of the processing and optical subsystems 41 and 42, respectively.

Figure 10:
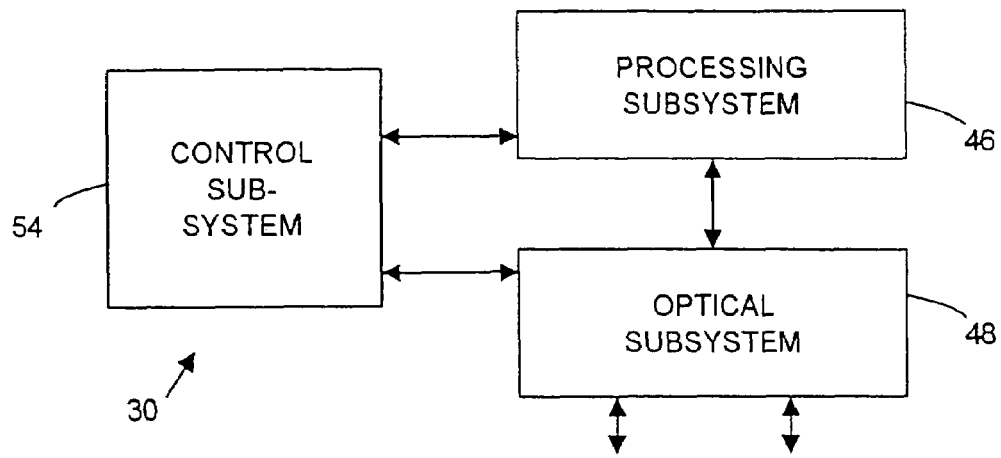
FIG. 10 illustrates a high-level functional diagram of a component of a system constructed according to the invention.

FIG. 10 illustrates a high-level functional diagram of a hub node 30. A processing subsystem 46 provides protocol-related processing functions such as the cross-connect/switching function and protocol processing for wavelengths $\lambda 1, \lambda 2, \ldots \lambda N$ generated by hub node 30. In case of a SONET/SDH application, the processing subsystem 46 provides the functionality of a SONET/SDH cross-connect, as well as all SONET/SDH-related protocol processing. In the case of an ATM application, the processing subsystem 46 provides the functionality of an ATM VPX and the associated protocol processing. The processing subsystem 46 provides to an optical subsystem 48 an electrical channel for each DWDM channel $\lambda 1, \lambda 2, \ldots \lambda N$ generated by node 30. The processing subsystem 46 receives the electrical signals derived from all incoming DWDM optical uplink signal $\lambda 1, \lambda 2, \ldots \lambda N$. The processing subsystem 46 typically also has external ports of different types in order to connect external devices which use the transport services of the network. The optical subsystem 48 has the capability to generate/terminate all the DWDM channels $\lambda 1, \lambda 2, \ldots \lambda N$ being used in the network 20. The optical subsystem 48 incorporates multiplexing/demultiplexing functionality for the DWDM channels $\lambda 1, \lambda 2, \ldots \lambda N$, as well as suitable transmitters and receivers. A control subsystem 54 manages, configures and monitors the operation of the processing and optical subsystems 46, 48, respectively.

Figure 11:
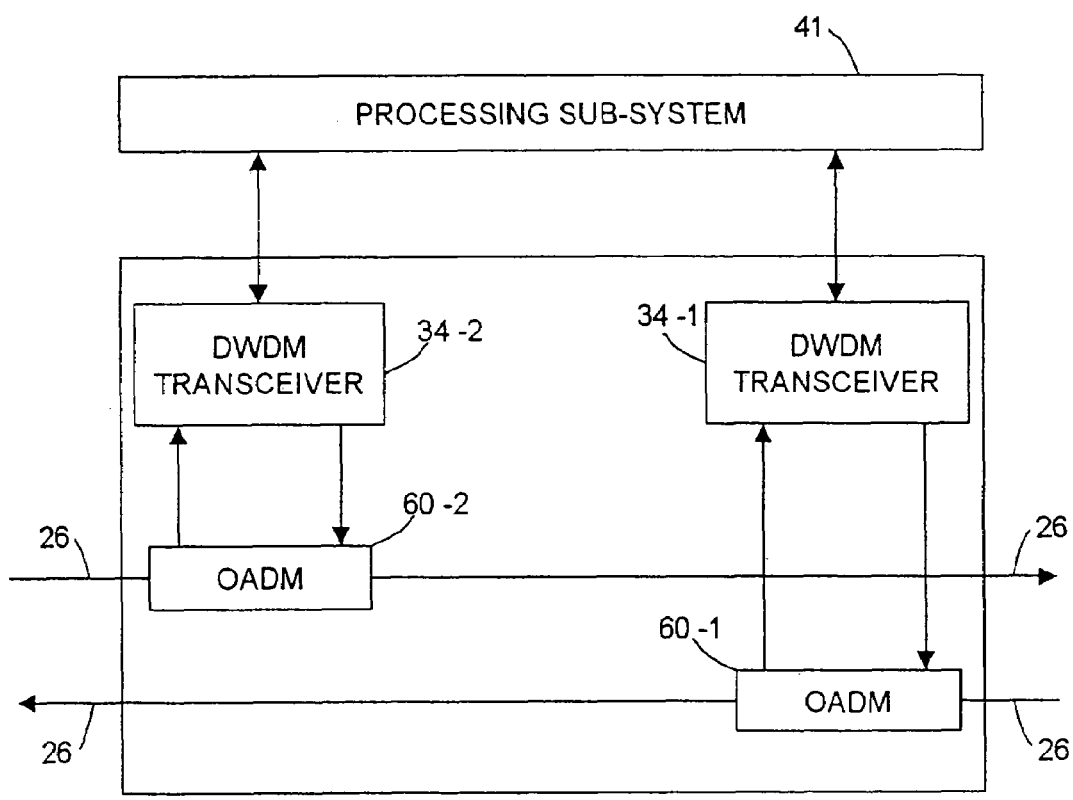
FIG. 11 illustrates certain details of a system constructed according to the invention.

FIG. 11 illustrates certain details of an implementation of a dual-homed DWDM ring 22. An optical add/drop multiplexer, or OADM, 60-1, 60-2 is able to drop a specific wavelength $\lambda D$, $1 \leq D \leq N$, from a DWDM combined signal on the fiber and route the dropped wavelength $\lambda D$ to a DWDM transceiver module 34-1, 34-2, respectively. The optical signal having the same wavelength $\lambda D$ generated by the DWDM transceiver 34-1, 34-2, respectively, is inserted by the OADM 60-1,60-2, respectively, into the aggregate DWDM signal $\lambda 1, \lambda 2, \ldots \lambda N$ on the fiber. Each OADM 60 is assigned to a specific DWDM wavelength $\lambda D$, and passes all other wavelengths unaffected. OADMs 60 are commercially available from several vendors. DWDM transceiver 34 is a set including a receiver 36 and a transmitter 38, both for a specific wavelength $\lambda D$. The transmitter 38 transforms an electrical signal generated, for example, by the processing subsystem 41, into an optical signal at a wavelength $\lambda D$. The receiver 36 transforms an optical signal at wavelength $\lambda D$ to an electrical signal and provides it to the processing subsystem 41. Such transmitters 38 and receivers 36 are commercially available from several vendors.

Figure 12:
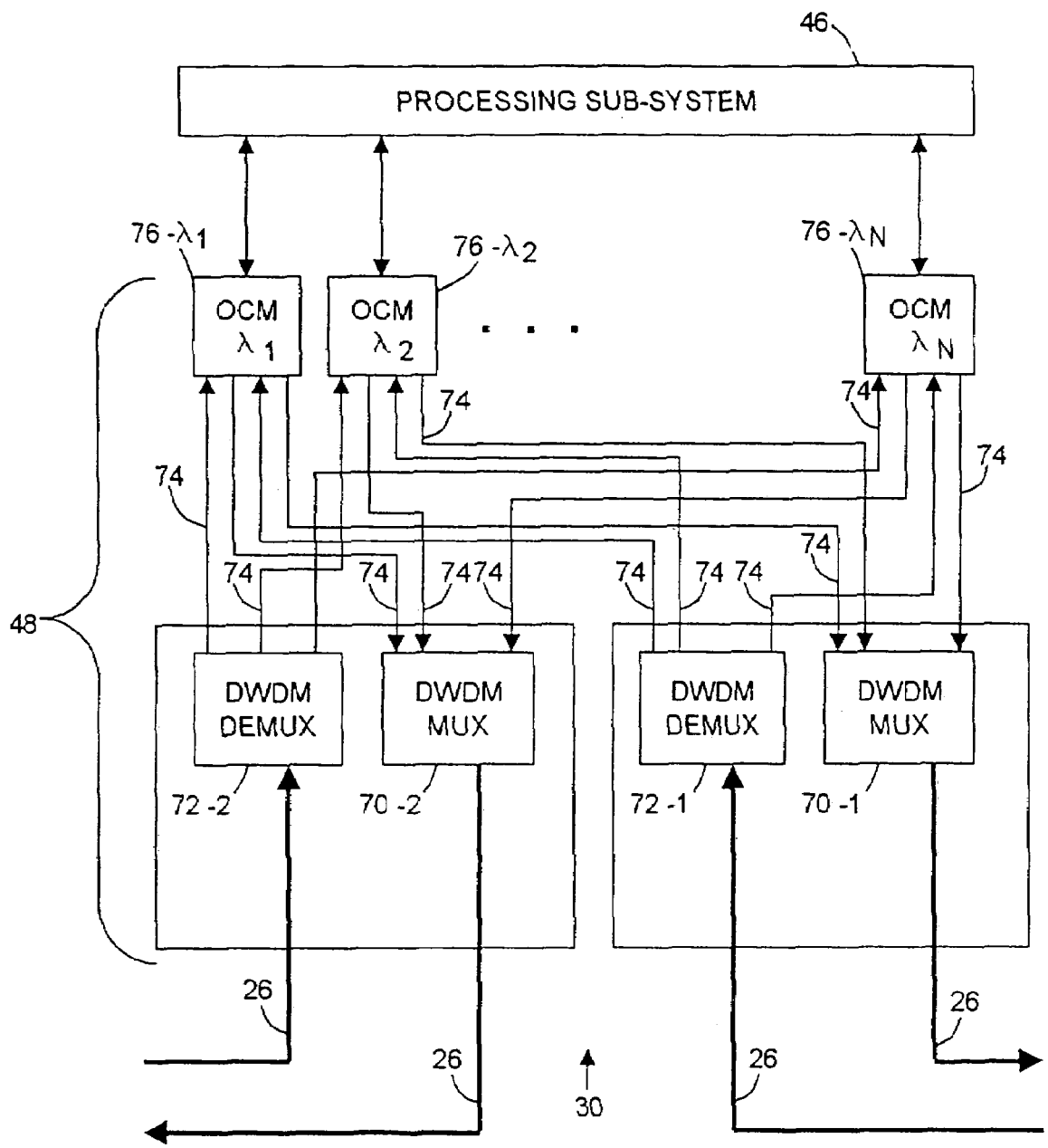
FIG. 12 illustrates certain details of a system constructed according to the invention.
Figure 13:
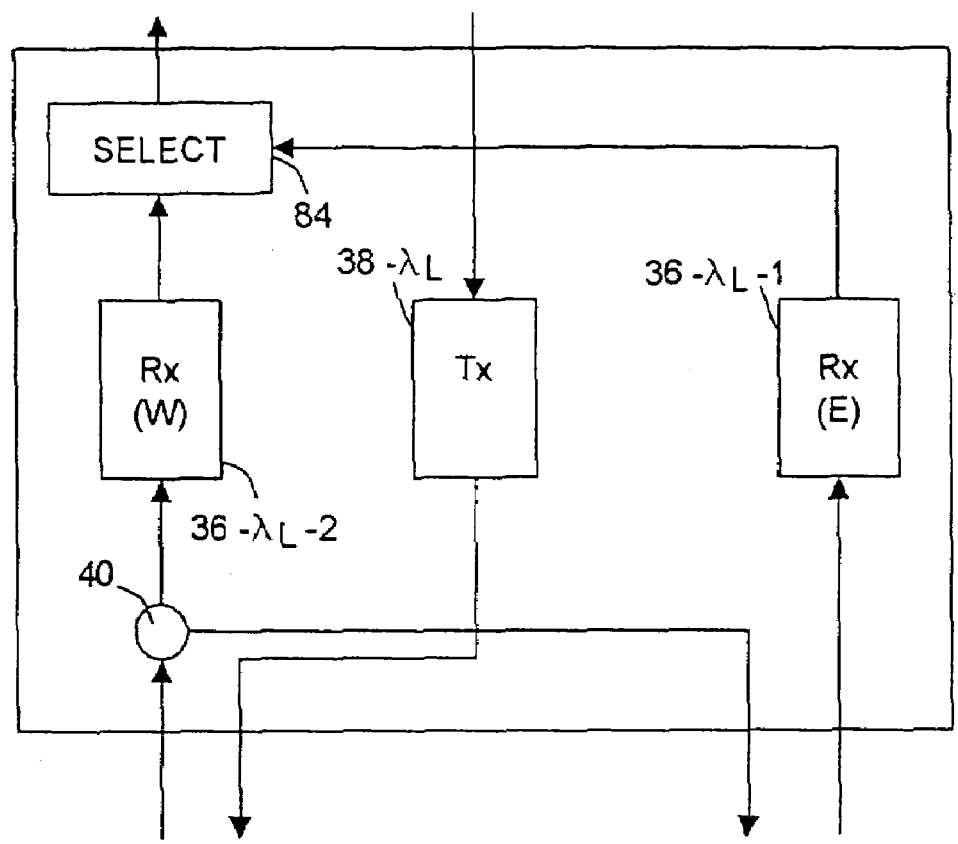
FIG. 13 illustrates a characteristic of networks constructed according to the invention; and, FIG. 14 illustrates a characteristic of systems constructed according to the invention.

FIG. 12 illustrates an implementation of an optical subsystem 48 of the hub node 30 in a dual-hub configuration. A DWDM multiplexer 70-1, 70-2 multiplexes several optical signals, each having a different wavelength $\lambda 1, \lambda 2, \ldots \lambda N$, into a single fiber output. DWDM multiplexers 70 are commercially available from several vendors. A DWDM demultiplexer 72-1, 72-2 separates a DWDM signal carried on a fiber 26 and containing several optical channels, each of a different wavelength $\lambda 1, \lambda 2, \ldots \lambda N$, into separate channel outputs $\lambda 1, \lambda 2, \ldots \lambda N$ on separate optical fibers 74. DWDM demultiplexers 72 are also commercially available from several vendors. An optical channel module, or OCM, 76-$\lambda L$, $1 \leq L \leq N$, is provided for each wavelength $\lambda 1, \lambda 2, \ldots \lambda N$, respectively. Each OCM 76-$\lambda L$ incorporates one DWDM transmitter 38-$\lambda L$ and two receivers 36-$\lambda L$-1 and 36-$\lambda L$-2 for the corresponding wavelength $\lambda L$. Such receivers 36-$\lambda L$-1 and 36-$\lambda L$-2 and transmitters 38-$\lambda L$ are commercially available from several vendors. There are two configurations of OCMs 76-$\lambda L$, the eastern configuration 76-$\lambda L$-E, and the western configuration 76-$\lambda L$-W. FIG. 13 illustrates the western configuration OCM 76-$\lambda L$-W. The incoming signals from two DWDM demultiplexers 72-1, 72-2 are coupled to the receivers 36-$\lambda L$-1 and 36-$\lambda L$-2. The resulting electrical signals are evaluated 84 for quality using, for example, the SONET overhead provisions, and the better quality one is provided to the processing subsystem 46. The western incoming signal is duplicated using a splitter 40, for example, an optical coupler, and transmitted to the eastern output. Again, this is an optical drop and continue operation. Such optical couplers 40 are commercially available from several vendors. The electrical signal provided by the processing subsystem 46 is transmitted on the western output.

The description of the eastern configuration OCM 76-λL-E is identical to the western configuration OCM 76-λL-W, except that east and west are reversed. That is, the eastern incoming signal is continued through a splitter 40 to the western output, and the signal generated by the transmitter 78-λL is sent to the eastern output.

Figure 14:
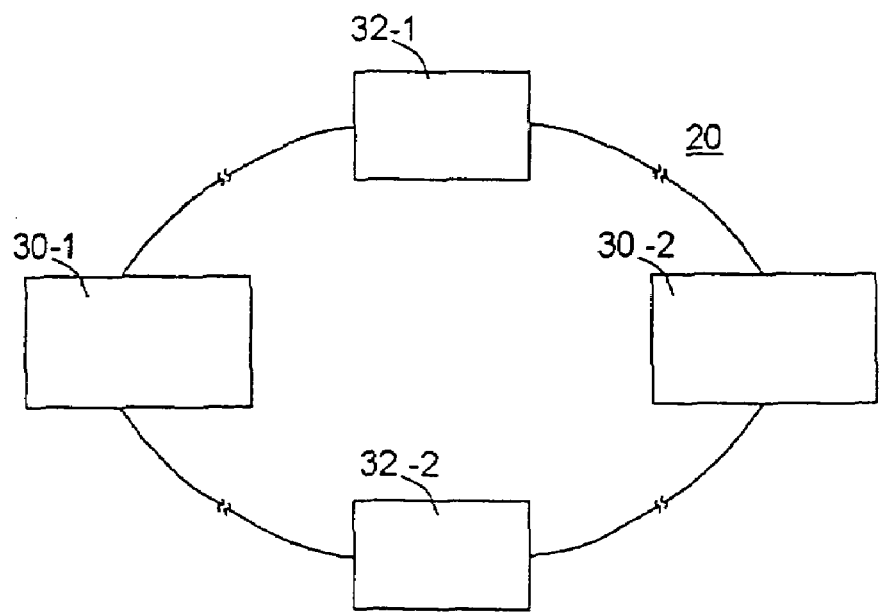

Different OCMs 76 within the same hub node 30 can be configured differently. The choice of a configuration for a specific OCM 76 depends on the relative location of the associated terminal node 32 with respect to the two hub nodes 30. This is illustrated in FIG. 14. Terminal node 32-1 is located to the east of hub node 30-1 and to the west of hub node 30-2. Therefore the OCM 76-λL-E in hub node 30-1 associated with terminal node 32-1 will have an eastern configuration, while the OCM 76-λL-W in hub node 30-2 associated with terminal node 32-1 will have a western configuration. The result is that the copy of the signal transmitted by terminal node 32-1 in the direction of hub node 30-1 will be received by hub node 30-1 and continued to hub node 30-2 around the ring 22 in one direction. The copy of the signal transmitted by terminal node 32-1 in the direction of hub node 30-2 will be received by hub node 30-2 and continued to hub node 30-1 around the ring 22 in the other direction. Each hub node 30 will receive two copies of the signal generated by terminal node 32-1, one from each direction of the ring 22. Terminal node 32-2 is located to the west of hub node 30-1 and to the east of hub node 30-2. Therefore the OCM 76-λL-W associated with terminal node 32-2 in hub node 30-1 will have a western configuration. The OCM 76-λL-E associated with terminal node 32-2 in hub node 30-2 will have an eastern configuration.

The invention claimed is:

1. A wavelength division multiplexing (WDM) network comprising:
   two fiber-optic rings, each ring comprising a plurality of terminal nodes and a plurality of hub nodes;
   each terminal node comprising a main receiver, a redundant receiver, a main transmitter, and a redundant transmitter for each optical carrier associated with the terminal node; and
   each hub node comprising at least one apparatus adapted for receiving and transmitting information at one optical carrier of a plurality of optical carriers associated with the fiber-optic rings coupled by the hub node, wherein each of said at least one apparatus comprises:
      a first receiver of the information carried, at said one optical carrier, by the first fiber;
      a second receiver of the information carried, at said one optical carrier, by the second fiber;
      a transmitter for transmitting the information, at said one optical carrier, on the second optical fiber;
      a splitter of an optical power of a signal carried by said one optical carrier, wherein the splitter couples a first portion of the power to the first receiver and couples a second portion of the power to a section of the first fiber; and
      a first selector selectively switching said one optical carrier from the first fiber to the second fiber.

2. The network of claim 1 wherein the section of the first fiber to which the second portion of the power is coupled extends to a downstream node of a fiber-optic ring.

3. The network of claim 1 wherein, for each apparatus, an output of the first receiver is coupled to a first input of the first selector.

4. The network of claim 1 wherein, for each apparatus, an output of the second receiver is coupled to a second input of the first selector.

5. The network of claim 1 wherein, for each apparatus, an input of the transmitter is coupled to a first output of the first selector.

6. The network of claim 1 wherein, for each apparatus, the first selector couples an output of the first receiver to an input of the transmitter when the apparatus and a section of the first fiber between the splitter and a downstream node are operable.

7. The network of claim 1 wherein, for each apparatus, the first selector couples an output of the first receiver to an input of the transmitter when the second receiver becomes inoperable or there is a cut in a section of the first fiber between the splitter and a downstream node of a fiber-optic ring.

8. The network of claim 1 wherein, for each apparatus, the first selector terminates an output of the first receiver and couples an output of the second receiver to an input of the transmitter when the first receiver becomes inoperable.

9. The network of claim 1 wherein the terminal node further comprises a second selector selectively switching said one optical carrier between the first fiber and the second fiber.

10. The network of claim 9 wherein an input of the main receiver is coupled to an output of the first fiber and an output of the main receiver is coupled to a first input of the second selector.

11. The network of claim 9 wherein an input of the redundant receiver is coupled to an output of the second fiber and an output of the redundant receiver is coupled to a second input of the second selector.

12. The network of claim 9 wherein an input of the main transmitter is coupled to a first output of the second selector and an input of the redundant transmitter is coupled to the first output of the second selector.

13. The network of claim 9 wherein the second selector couples an output of the main receiver to an input of the main transmitter and couples an output of the redundant receiver to an input of the redundant transmitter when the terminal node and upstream and downstream sections of the first and second fibers are operable.

14. The network of claim 9 wherein the second selector couples an output of the main receiver to an input of the redundant transmitter when the main transmitter or a section of the first fiber between the main transmitter and a downstream node is inoperable.

15. The network of claim 9 wherein the second selector couples an output of the redundant receiver to an input of the main transmitter when the main receiver or a section of the first fiber between the main receiver and an upstream node is inoperable.

16. A wavelength division multiplexing (WDM) network comprising:
   a first fiber-optic ring and a second fiber-optic ring, each fiber-optic ring comprising a plurality of terminal nodes and a plurality of hub nodes;
   wherein each terminal node comprises a main receiver, a redundant receiver, a main transmitter, and a redundant transmitter for each optical carrier associated with the terminal node;
   wherein each hub node comprises at least one apparatus adapted for receiving and transmitting information at one optical carrier of a plurality of optical carriers associated with the fiber-optic rings coupled by the hub node;

wherein the two fiber-optic rings are interconnected by a first ring interconnection between a first hub node of the first fiber-optic ring and a first hub node of the second fiber-optic ring and a second ring interconnection between a second hub node of the first fiber-optic ring and a second hub node of the second fiber-optic ring;

wherein the first hub node of the first fiber-optic ring receives optical signals on a first fiber of the first fiber-optic ring and forwards the received optical signals to the second hub node of the first fiber-optic ring using the first fiber of the first fiber-optic ring, wherein the second hub node of the first fiber-optic ring receives optical signals on a second fiber of the first fiber-optic ring and forwards the received optical signals to the first hub node of the first fiber-optic ring using the second fiber of the first fiber-optic ring;

wherein the first hub node of the first fiber-optic ring selects the optical signals on the first fiber or the optical signals on the second fiber and forwards the selected optical signals to the first hub node of the second fiber-optic ring;

wherein the second hub node of the first fiber-optic ring selects the optical signals on the second fiber or the optical signals on the first fiber and forwards the selected optical signals to the second hub node of the second fiber-optic ring.

* * * * *